United States Patent [19]
Corbett

[11] 3,891,870

[45] June 24, 1975

[54] ROTATING PIEZOELECTRIC TRANSDUCER MOUNTING

[76] Inventor: James Patrick Corbett, Old Manor House, 27 Station Rd., Thames Ditton, England

[22] Filed: Mar. 15, 1974

[21] Appl. No.: 451,457

Related U.S. Application Data

[63] Continuation of Ser. No. 302,098, Oct. 30, 1972.

[30] Foreign Application Priority Data

Nov. 23, 1971 United Kingdom............... 54410/71

[52] U.S. Cl........... 310/8.7; 73/517 AV; 73/DIG. 4; 310/9.1; 310/8.2; 310/8.9
[51] Int. Cl............................................. H04r 17/00
[58] Field of Search......... 310/8.4, 8.7, 8.9, 9.1–9.4; 73/517 R, 517 AV, 141, 398

[56] References Cited
UNITED STATES PATENTS

| | | | |
|---|---|---|---|
| 2,315,756 | 4/1943 | Warner | 73/398 X |
| 3,033,043 | 5/1962 | Runft | 73/517 |
| 3,045,491 | 7/1962 | Hart | 310/8.7 X |
| 3,274,828 | 9/1966 | Pulvari | 310/8.7 X |
| 3,386,292 | 6/1968 | Watson et al. | 73/517 AV |

Primary Examiner—Mark O. Budd
Attorney, Agent, or Firm—Harvey G. Lowhurst

[57] ABSTRACT

This invention relates to an oscillating crystal force transducer having a frame containing a plate-like piezo electric crystal mounted upright with respect to a base plate in the frame and a spigot arranged to bear on the upper edge of the crystal to transmit thereto a force to be transducer. The spigot is provided with a resilient spring mounting to maintain the alighment of the spigot with respect to the crystal, and to hold the crystal in position.

17 Claims, 10 Drawing Figures

PATENTED JUN 24 1975   3,891,870

SHEET 2

ROTATING PIEZOELECTRIC TRANSDUCER MOUNTING

This is a continuation of application Ser. No. 302,098, filed Oct. 30, 1972.

The angular and lateral positions of the crystal in its plane may be adjusted to ensure that the line of action of the force passes through the center of the active area of the crystal at an angle to the X-axis of the crystal such that the temperature coefficient of the relation between the force applied and the resonant frequency thereof is substantially zero.

The force transducer may form part of a force transducing system wherein means are provided for determining the resonant frequency of the crystal in various loading conditions and thereby producing a result indicative of the forces applied to the crystal.

FIELD OF THE INVENTION

This invention relates to oscillating crystal force transducers, and particularly to the transducer system described in, for example, my prior U.S. Pat. No. 3541849.

SUMMARY OF THE INVENTION

According to the present invention, there is provided a force transducer comprising a frame including a base, a plate-like piezo electric crystal which is mounted upright with respect to the base by engagement of opposite edge portions with the base and one end of a spigot which is arranged to transmit a force to be transduced to the crystal, a resilient mounting, between the frame and the spigot, said mounting serving to hold the spigot aligned with the crystal and by means of the spigot to hold the crystal in position, and electrical connections to the crystal.

The main purpose of the provision of the spigot and the way it is mounted is to obtain a linear relationship between the applied force and the resonant frequency of the crystal. As will be explained in more detail hereinafter, a preferred form of the invention includes several subsidiary features all directed to achieving this purpose.

According to a further aspect of the present invention there is provided a force transducing system comprising a force transducer as set forth, an electrical oscillatory circuit of which the resonant frequency is determined by the crystal and means for measuring a force in accordance with the difference between the resonant frequency when the crystal is loaded by the force and the resonant frequency when the loading of the crystal by the force is relieved.

DESCRIPTION OF THE PREFERRED EMBODIMENTS

Figure 1:
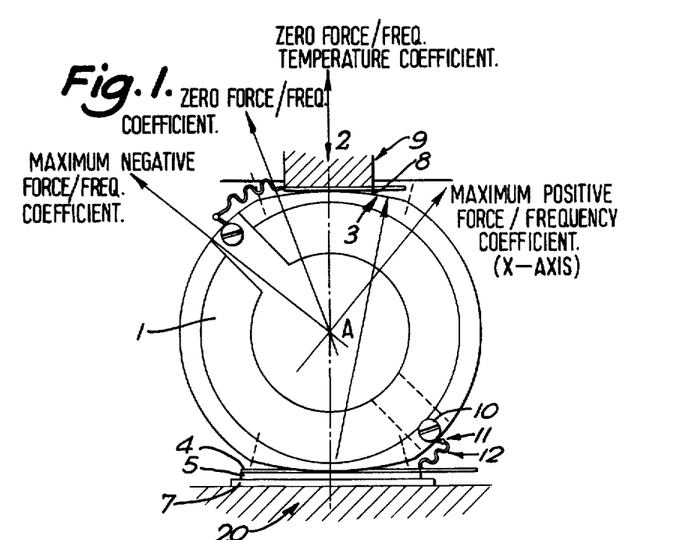
FIG. 1 shows a quartz crystal for a transducer.

In FIG. 1 a crystal 1 is shown disposed on a shim 4 of brass or material of similar hardness, preferably between 0.001 and 0.003 inches thick. In use, the crystal wears a permanent indent in the shim 4 thereby producing its own seating. Beneath the shim 4 is a platform 5 of stainless steel, which is insulated from a base plate 20 by a second shim 7 of glass mica. At the diametrically opposite edge of the crystal, a further shim 8 of brass or material of similar hardness again preferably 0.001 to 0.003 inches thick secures the top of the crystal, which in use, wears an indent in the shim 8, forming its own seating therein. The shim 8 is attached to an upper force platform 9 through which force is applied to this edge of the crystal.

In this embodiment, the crystal chosen is of quartz, having a fundamental frequency in the region of 0.1 to 20 MHz. The crystal shown is substantially circular in shape, but may be perfectly circular or of any other regular shape. The periphery of the crystal is shown to be bevelled, but this is not essential. Bevelling of the edge of the crystal does tend, however, to reduce unwanted modes of oscillation in the crystal.

The force platform 9 is so arranged that the line of action 2 of a force applied to the crystal passes through the centre of the active area of the crystal, i.e., it passes through point A. This line of action 2 is applied to the crystal at an angle to the X-axis to reduce the temperature coefficient of the force/frequency constant to zero. This angle is 40° for an AT cut quartz crystal of 5.16 MHz having a bevelled edge, but varies for other crystals depending on factors such as crystal diameter, frequency, the diameter of any plating on the crystal and bevelling. However, this angle is usually in the range between 35° and 45° on either side of the X-axis.

Figure 2:
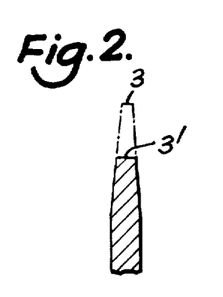
FIG. 2 shows an enlarged view of the side of the crystal to which the force is applied.

In FIG. 1 and more particularly in FIG. 2 the top edge 3 of the crystal is shown to be reduced in width i.e., the periphery of the crystal along edge 3 has a greater radius of arc that than of the remainder of the crystal. For example, the edge 3 is chamfered to provide a width of crystal seating edge 3' (FIG. 2) which is preferably between 60% and 90% of the thickness of the crystal to reduce the pressure on this edge to a minimum, consistent with adherence to the requirement that the line of action 2 of the applied force passes through point A under all load conditions. The lower edge of the crystal may be similarly chamfered as shown.

This chamfering of the top and/or bottom edges of the crystal is advantageous to the use of the crystal but may, on grounds of high manufacturing costs or loss of ability to adjust the angular position of the crystal over a wide range, be omitted.

Figure 3:
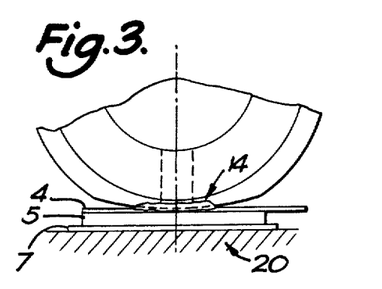
FIGS. 3 and 4 show alternative methods of attaching electrodes to the crystal shown in FIG. 1.
Figure 4:
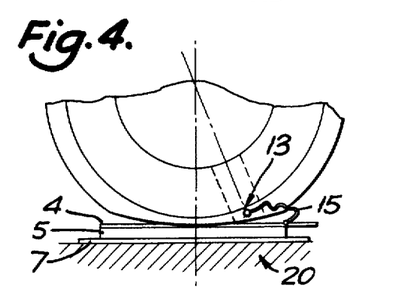

In FIGS. 1, 3 and 4 are shown three different methods of connecting the electrodes to the crystal. In FIG. 1, a stainless steel wire clip 10 is attached to a crystal electrode which is disposed at an angle approximately at right angles to the X-axis of the crystal. A fine copper wire 12 is soldered at a point 11 to the clip 10 and is connected to the brass shim 4 from whence there is a connection to suitable circuitry as hereinafter described. Similar connection is made to the brass shim 8 which is earthed.

Alternatively, as shown in FIG. 3, the crystal electrodes are disposed along the line of action 2 of the applied force. Connection to the brass shim 4, for example, is made directly by using a small quantity of silver-impregnated lead borate or similar conducting cement, indicated at 14, which has been processed at high temperature and arranged along the crystal edge before the crystal is seated, as shown.

A further method of connecting the electrodes is shown in FIG. 4 where a fine copper wire 15 is secured by silver-impregnated lead borate or similar conducting cement, indicated at 13, to the crystal electrode. The use of silver-impregnated lead borate does not reduce the quality factor Q of the crystal markedly as do other materials for example solder. In this case, to minimise unwanted force effects due to the connection at 13, the crystal electrodes are disposed along the line of zero force coefficient in the crystal. The other end of the wire 15 is attached to the brass shim 4.

Figure 5:
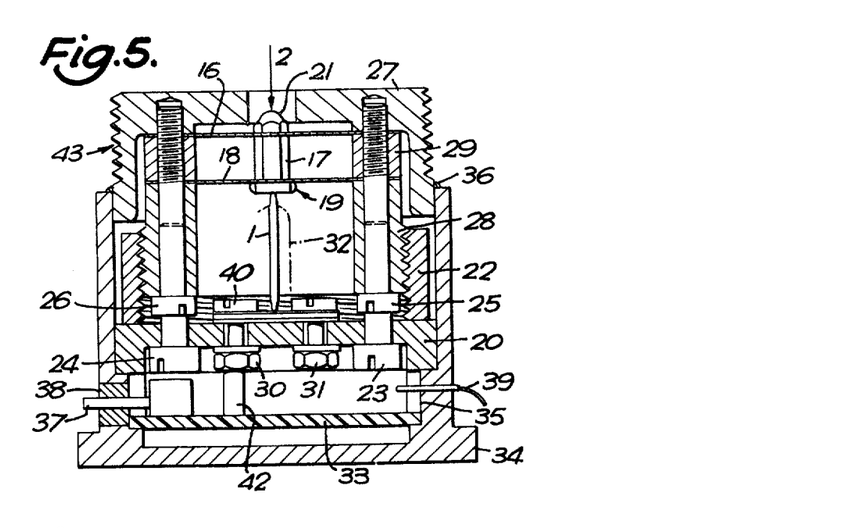
FIG. 5 shows a combined crystal module and oscillator circuit.

Referring now to FIG. 5, the crystal 1 is disposed between shims as previously described within a crystal module generally indicated at 43. A force may be applied to the crystal 1 along the line of action 2 via a spigot or like narrow member indicated at 19. The preset force holding crystal 1 in position is maintained by a diaphragm 18, which together with a second diaphragm 16, holds the spigot 19 in place perpendicular to the base 20 of the module. The diaphragm 16 is approximately 0.003 inches thick.

Alternatively, the diaphragm 18 may be a metal spring of approximately 0.010 inches thick, its length being orientated in the plane of the crystal.

The purpose of the diaphragm 16 is to hermetically seal the cavity holding the crystal.

Spigot 19 includes a collar 17 and a domed nut 21 which secures the diaphragms 16 and 18 against the ends of the collar 17. The force to be measured is applied to the domed nut 21.

The preset force is applied and adjusted by rotation of a ring nut 22. The base of the module 43 is held in position by screws 23 and 24. Screws 25 and 26 hold the outer edges of diaphragms 16 and 18 by forcing a ring 27 towards a ring 28, a spacing ring 29 being disposed therebetween. The nuts 30 and 31 and their associated screws secure the brass shim 4, platform 5 and glass mica shim 7 shown in FIG. 1 to the base plate 20. Spring clips 32 (only one is shown in FIG. 5) are used to secure the crystal 1 in position during assembly of the module. The clips project through holes in the base 20 and may be rotated from below the base 20 until they are clear of the crystal 1 whereafter they are lodged against the inside walls of the module.

Once the crystal module is assembled as described hereinbefore, the oscillator circuit is attached in the form of a base 34 which houses a printed circuit board 33 comprising a simple two-transistor oscillator circuit. A spacer ring 35 separates the lower edge of the base plate 20 from the circuit board 33. The base 34 is fitted over the ring 27 and seam welded at 36 to form a hermetically sealed enclosure which may be filled with inert dry nitrogen to stud long term chemical ageing effects to a electrical To fill the enclosure thus, a tube 39 is provided in the base 34.

The nut 30 via its associated screw 40 is in electrical connection with the lower crystal electrode as previously described. The nut 30 is also in contact with a stand 42 on the circuit board 33. The elecrical connections 37 from the circuit board 33 protrude through a glass seal 38 in the base 34. The upper crystal electrode is earthed through the diaphragms 16 and 18 and the module.

Figure 6:
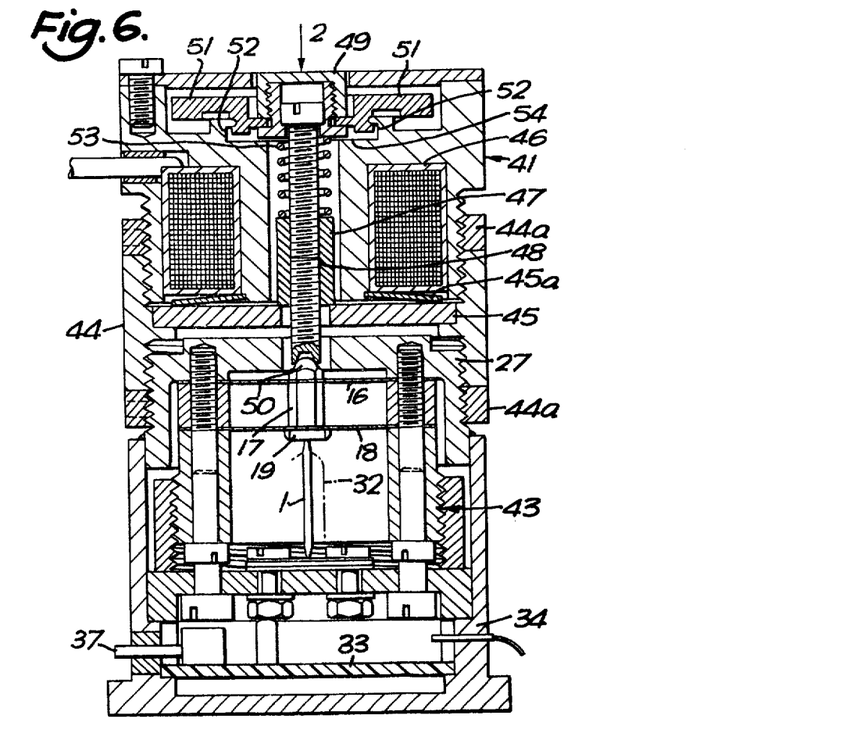
FIG. 6 shows a complete transducer with oscillator and solenoid.

In FIG. 6, the module 43 and base 34 are attached to a solenoid unit indicated at 41, by means of a collar 44 screwed onto the ring 27, and held there by locking rings 44a. Energization of a solenoid coil 46 causes a solenoid armature 45 to lift a collar 47 via a screw 48 and a force pedestal 49, thereby removing any force previously applied to the crystal at a point 50 along the line of action 2. De-energisation of solenoid coil 46 allows the armature 45 to fall back under the influence of a return spring plate 45a, causing a re-application of force to the crystal at point 50. The pedestal 49, screw 48 and all associated parts are counterbalanced by six sector-shaped counterpoise weights 51, hinged about respective fulcra 52.

If the pedestal 49 is overloaded, a helical spring 53 is compressed. The spring 53 is disposed about the screw 48, abutting against the pedestal 49 at its upper end and against the collar 47 at its lower end. When compressed the pedestal 49 moves downwards so that a flange 54 sits on top of the body of the solenoid unit 41. In normal operation of the embodiment of FIG. 6, pedestal 49 lifts only by a few thousandths of an inch against the applied force i.e., only a sufficient distance to ensure that the force is fully removed from the crystal at the point 50.

In many applications of the transducer of FIG. 6, it has been found desirable to obtain larger frequency change per unit force applied than is immediately available from the effect of applying a load to the crystal in its first harmonic mode of oscillation. The use of crystals in their third or fifth harmonic modes of oscillation results in three or five times as large a frequency change. However, a more flexible arrangement may be desired, allowing any discrete multiple of the fundamental frequency change of the crystal to be obtained. This flexibility may be provided, for example, by the use of a phase-locked frequency multiplier.

Figure 7:
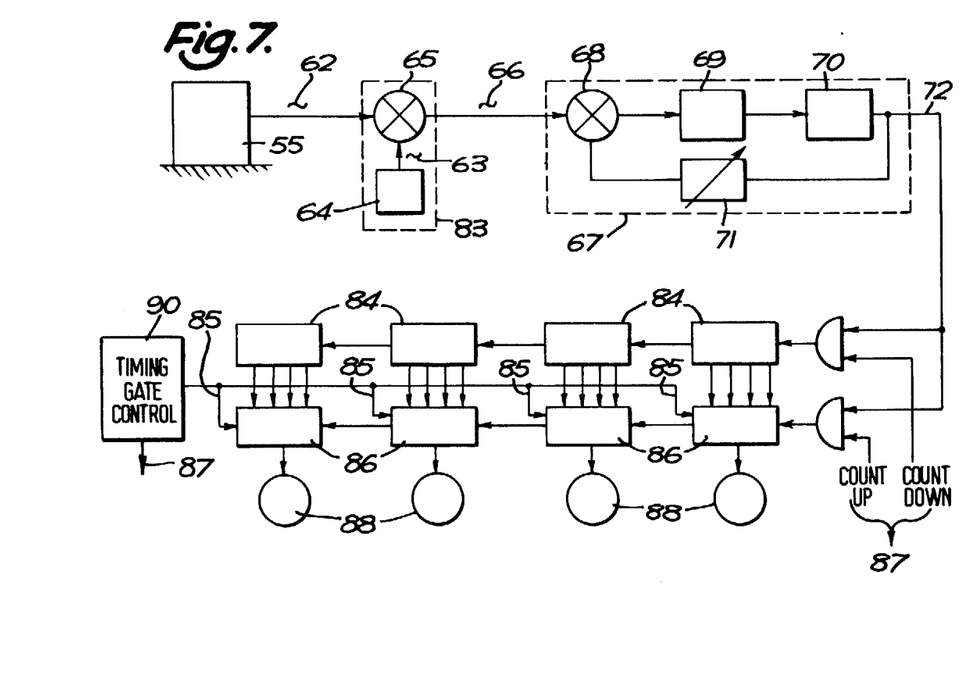
FIG. 7 shows diagrammatically a circuit for multiplication of output frequency which is connected to a circuit suitable for use with an infrequent re-zeroing mode of operation.

In FIG. 7, a transducer 55 assembled as hereinbefore described, is connected to cavity 83 whereby the output frequency 62 is subtracted in a frequency differencing or beat frequency circuit 65 from a slightly lower frequency signal 63 which forms the output of an auxiliary non-force dependent crystal oscillator 64. The difference frequency signal 66 is relatively small when compared to the high frequency signals from the transducer 55. The difference frequency signal 66 is fed to a phase-locked loop 67 where it is multiplied. The circuitry 83 is provided since if the transducer output signal 62 were directly multiplied, frequencies of magnitudes too large for handling in a reversible digital converter would result.

In the phase-locked loop 67, a phase detector 68 receives the difference frequency signal 66. The output of the phase detector 68 is fed through a low pass filter 69, and is fed as a D.C. voltage to control the frequency of a multivibrator 70. The output of the multivibrator 70 is fed to a divider counter 71. Finally the output of the counter 71 is compared in the phase detector 68 with the difference frequency signal 66.

The output 72 of the phase-locked loop 67 is fed to a reversible counter such as that hereinafter described. This output 72 represents a direct multiple of the difference frequency 66. Frequency changes due to loads applied to the transducer are thus multiplied.

The re-zeroing feature inherent in the difference-frequency procedure hereinafter described prevents drifting of the auxiliary oscillator output 63 from affecting the accuracy of the apparatus.

In applications of the transducer where it is used in, for example, shop weighing machines, further multiplication, or division if required, of the period count resulting from the transducer output frequency, can be produced by varying the length of the counting period. Such a technique would enable prices to be calculated.

Since it is frequently inconvenient to periodically apply a force to the crystal and remove it alternately to ascertain the difference frequency a system such as that shown in FIG. 7 to which the output 72 of the phase locked loop 67 is fed may be used.

In this system, the force is removed from the crystal at infrequent intervals, the frequency or period count is ascertained using a down-counter 84. This "no-load" period down-count information is transferred to an up-counter 86, the force is applied, causing the up-counter 86 to count for a similar period of time thereby producing a result indicating the difference frequency count. This result is proportional to the force applied and hence an indication of the force applied may be shown on a Nixie tube 88 or similar display device.

As the no-load period down-count is also digitally stored in the down-counter 84 signals representing this information may be fed to the up-counter 86 each time the latter has been cleared and a change is applied force has been made. This produces a new difference frequency output from the up-counter 86.

This non-destructive transferral procedure may continue until another re-zeroing operation is performed. The accuracy of this system is partly dependent on the stability of the oscillator which defines the time period of each counting operation; which in this case is the timing gate control 90.

The timing gate control 90 initiates in transfer control lines 85 transference of the no-load period down-count signal from the down-counter 84 to the up-counter 86, and also controls, via lines 87, the period of each counting operation.

The determination of the period between each re-zeroing operation may be performed by a clocking mechanism such that a re-zeroing operation is carried out after a discrete period of time. Alternatively, a re-zeroing operation might be performed after a preselected number of weighing operations, or be initiated by any frequency drift originating in the transfer no-load or steady on-load frequency variation caused, for example, by a change in the ambient temperature.

In order to accurately locate that angular portion of the crystal where the temperature coefficient of the force/frequency constant is zero, two jigs 56 and 61 are provided (see FIG. 8) which may be fitted onto the module 43 as hereinafter described to enable rotational movement of the crystal over a few degrees about its centre. Additionally, movement of the crystal laterally for a few thousandths of an inch is also possible, using these jigs, so that the crystal may take up a position where the change of crystal frequency with respect to force applied is a linear relationship. In general this requires that the line of action of the force passes through the centre of the crystal i.e., point A in FIG. 1, the centre of the plated area.

Figure 8:
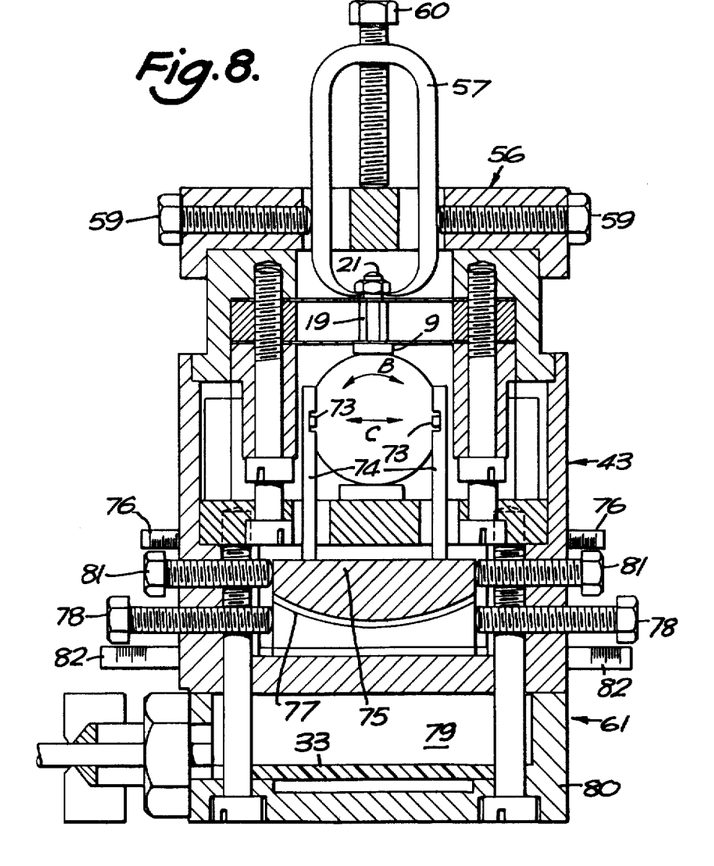
FIG. 8 shows apparatus for adjusting the angular position of the crystal with respect to the line of force.

The jig 56 comprises a claw 57 arranged to be inserted under the nut 21 on the end of the spigot 19 when the jig 56 is placed over the module 43. Screw 60 is adjusted to insert the ends of the claw under nut 21 and screws 59 and tightened thereby raising the spigot 19 and removing the preset force from the crystal. Normally, the crystal position is adjusted when the crystal is in oscillation. Thus, since the platform 9 on the end of the spigot and associated shim form the earthing connection for the upper crystal electrode, the correct adjustment of screw 60 to release the crystal from the force applied to it in readiness for rotational and/or lateral adjustment is signified by the cessation of oscillation of the crystal as the circuit through it is broken. The spigot 19 is only raised by a few thousandths of an inch.

Figure 9:
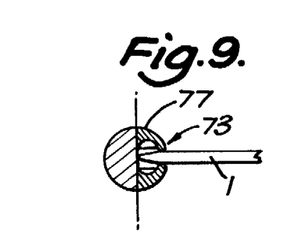
FIG. 9 shows a spring clip for use with the apparatus of FIG. 8.

When the crystal is thus free of any applied force, the jig 61, attached to the base of the module when jig 56 is fitted over the top thereof, is operated as follows. Spring clips 73 grip the side edges of the crystal 1. These clips 73 are secured to rods 74 having linear longitudinal slots therein to guide the edges of the crystals. FIG. 9 shows one of the spring clips 73 in detail. The rods 74 are attached to a rockable platform 75. To adjust the angular position of the crystal screws 81 are suitably tightened or loosened, the amount of adjustment being indicated by linear scales 76 mounted on the jig 61. The adjustment of the screws 81 causes rotational movement of platform 75 in an arcuate guide 77, thus causing the crystal to rotate about its centre as indicated by the double-headed arrow B in FIG. 8.

Lateral adjustment of the crystal is effected by manipulation of the screws 78, their position being indicated on linear scales 82. The screws 78 bear on the arcuate guide 77 and move the crystal in the directions indicated by the double-headed arrow C in FIG. 8.

A printed circuit board 33, identical to that used in the oscillator circuit in FIG. 5, is located in a cavity 79 in the outer casing 80 of jig 61. This circuit board causes the crystal to be in oscillation during the adjustment operation.

This adjustment operation is performed as is hereinafter described. Once the two jigs 56 and 61 have been assembled on the module 43 as described previously, screws 81 are first retracted. Screws 78 are manipulated to move the crystal to a position in which the change of crystal frequency with change in force is linear. To check this, screw 60 is rotated to allow the pre-force to be re-applied to the crystal, i.e. to allow the spigot 19 to contact the crystal again. Jig 56 is then removed and various forces applied to the spigot 19 until the above-mentioned linearity is achieved.

Once this is obtained, the jig 56 is replaced and screw 60 adjusted to relieve the crystal of the pre-force applied to it. Screws 81 are now manipulated to rotate the crystal into a position in which the temperature coefficient of the force/frequency constant is zero. Usually, for a given design of crystal, it is not necessary to measure the temperature coefficient after each adjustment as a particular frequency sensitivity with respect to change in applied force is produced by the transducer when the temperature coefficient is zero.

When all adjustments have been made, jig 56 is first removed from the module 43. Jig 61 is then removed by withdrawing the rods 74 from the holes in the module base plate. The module is now ready for assembly with the oscillator circuit as shown in FIG. 5.

Figure 10:
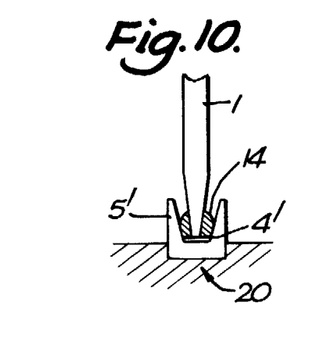
FIG. 10 shows an alternative method of mounting the crystal in the module.

In FIG. 10, the crystal 1 is mounted on a brass element 4' contained within a stainless steel seating 5' mounted in the base plate 20 in such a way that the seating 5' can swivel with respect to the base plate 20. In this way, the crystal is prevented from twisting when in use. The seating 5' is preferably short so that the line of force through the crystal does not shift.

I claim:

1. A force transducer comprising:
   an enclosure including a frame and a base;
   a plate-like piezo electric crystal mounted in said enclosure upright with respect to said base;
   means for mounting said crystal in position and for permitting rotation of said crystal in its own plane, said means for mounting comprising a seat on said base, and a spigot for transmitting a force to be measured to said crystal, said base and said spigot engaging opposite edge portions of said crystal, said spigot being disposed in the plane of said crystal and aligned substantially with the center of the active area thereof;
   first support means including a flexible diaphragm which is fixed to said frame and extends across it so as to complete said enclosure, said diaphragm laterally surrounding said spigot and engaging same;
   second support means which are laterally rigid and which are attached to said frame and to said spigot, said first and second support means each being arranged to restrain said spigot resiliently in a longitudinal direction and rigidly in a lateral direction and to clamp said crystal between said spigot and said base; and
   electrical connections to said crystal, said connections extending outside said enclosure.

2. A force transducer comprising:
   an enclosure including a frame and a base;
   a plate-like piezo electric crystal mounted in said enclosure upright with respect to said base;
   means for mounting said crystal in position and for permitting rotation of said crystal in its own plane, said means for mounting comprising a seat on said base, and a spigot for transmitting a force to be measured to said crystal, said base and said spigot engaging opposite edge portions of said crystal, said spigot being disposed in the plane of said crystal and aligned substantially with the center of the active area thereof;
   first support means including a flexible diaphragm which is fixed to said frame and extends across it so as to complete said enclosure, said diaphragm laterally surrounding said spigot and engaging same;
   second support means including at least one resilient member engaging said frame and extending from said frame substantially parallel to said diaphragm to engage said spigot so as to apply a preset force to said crystal via said spigot to clamp said crystal between said spigot and said base, said first and second support means each being arranged to restrain said spigot resiliently in a longitudinal direction and rigidly in a lateral direction; and
   electrical connections to said crystal, said connections extending outside said enclosure.

3. A force transducer as claimed in claim 2, wherein the angular position of said crystal relative to the line of action of said force to be measured applied via said spigot to said crystal is such that the temperature coefficient of the relation between said force to be measured applied to said crystal and the resonant frequency of said crystal is substantially zero.

4. A force transducer as claimed in claim 3, wherein the angle between the X axis of said crystal and said line of force is substantially 40°.

5. A force transducer as claimed in claim 2, further comprising:
   means for adjusting the lateral position of said crystal in its plane.

6. A force transducer as claimed in claim 2, wherein said electrical connections are joined to said crystal by a conducting cement.

7. A force transducer as claimed in claim 6, wherein said conducting cement is lead borate impregnated with silver.

8. A force transducer as claimed in claim 2, wherein said electrical connections extend to said crystal from said spigot and said base.

9. A force transducer as claimed in claim 2, wherein said electrical connections include electrodes, each electrode extending over part of a respective broad face of said crystal, said electrodes encompassing a region through which passes said line of action of said force to be measured applied to said crystal via said spigot.

10. A force transducer as claimed in claim 2, wherein said enclosure is occupied by an inert gas.

11. A force transducer as claimed in claim 3, wherein electromechanical means are provided for relieving the loading of said crystal.

12. A force transducer as claimed in claim 11, wherein said electromechanical means comprises a solenoid which has an armature coupled to said spigot.

13. A force transducing system comprising:
   a force transducer as claimed in claim 2;
   an electrical oscillatory circuit of which the resonant frequency is determined by said crystal; and
   means for measuring said force to be measured applied to said crystal via said spigot in accordance with the difference between the resonant frequency when said crystal is loaded by said force and the resonant frequency when the loading of said crystal by said force is relieved.

14. A force transducing system as claimed in claim 13, further comprising:
   means are provided for periodically relieving the loading of said crystal.

15. A force transducing system as claimed in claim 13, wherein said means for measuring said force comprises a reversible counter arranged to count cycles of oscillation of said oscillatory circuit.

16. A force transducer comprising:
   an enclosure comprising a frame and a base;
   a plate-like piezo electric crystal mounted in said enclosure upright with respect to said base;
   means for mounting said crystal in position and for permitting rotation of said crystal in its own plane, said means for mounting comprising a seat on said base, and a spigot for transmitting a force to be measured to said crystal, said base and said spigot engaging opposite edge portions of said crystal, said spigot being disposed in the plane of said crystal and aligned substantially with the center of the active area thereof;

first support means including a flexible diaphragm which is fixed to said frame and extends across it so as to complete said enclosure, said diaphragm laterally surrounding said spigot and engaging same;

second support means including a second flexible diaphragm engaging said frame and extending from said frame substantially parallel to said diaphragm to engage said spigot so as to apply a present force to said crystal via said spigot to clamp said crystal between said spigot and said base, said first and second support means being arranged to restrain said spigot resiliently in a longitudinal direction and rigidly in a lateral direction; and electrical connections to said crystal, said connections extending outside said enclosure.

17. A force transducer comprising:

an enclosure comprising a frame and a base;

a plate-like piezo electric crystal which is mounted upright with respect to said base;

means for mounting said crystal, said means for mounting comprising a seat disposed on said base and a spigot for transmitting a force to be measured to said crystal, said spigot being disposed in the plane of said crystal and aligned substantially with the center of the active area thereof, said seat and said spigot engaging opposite edge portions of said crystal, whereby said crystal can be rotated in its own plane;

a first flexible diaphragm which is fixed to said frame and extends across it so as to complete said enclosure, said first diaphragm laterally surrounding said spigot and engaging same;

a second flexible diaphragm which is fixed to said frame, said second diaphragm laterally surrounding said spigot and engaging same to apply a present force to said crystal to clamp said crystal between said spigot and said base, said first and second diaphragms being arranged to restrain said spigot resiliently in a longitudinal direction and rigidly in a lateral direction;

electrical connections to said crystal, said connections extending outside said enclosure; and means for permitting said seat to swivel with respect to said base.

* * * * *

UNITED STATES PATENT OFFICE
CERTIFICATE OF CORRECTION

Patent No. 3,891,870                               Dated    June 24, 1975

Inventor(s)  JAMES PATRICK CORBETT

It is certified that error appears in the above-identified patent and that said Letters Patent are hereby corrected as shown below:

Column 3, line 66: change "stud" to --reduce--,

"      line 67: change "electrical" to --minimum.--

Column 10, line 14; change "present" to --preset--.

Signed and Sealed this sixth Day of January 1976

[SEAL]

Attest:

RUTH C. MASON
*Attesting Officer*

C. MARSHALL DANN
*Commissioner of Patents and Trademarks*